United States Patent [19]

Caspers et al.

[11] Patent Number: 5,109,372

[45] Date of Patent: Apr. 28, 1992

[54] LOADING DEVICE FOR A RECORD AND/OR REPRODUCTION SET

[75] Inventors: Johannes Caspers; Thomas Riester, both of Villingen-Schwenningen, Fed. Rep. of Germany

[73] Assignee: Deutsche Thomson-Brandt GmbH, Villingen-Schwenningen, Fed. Rep. of Germany

[21] Appl. No.: 446,991

[22] Filed: Dec. 6, 1989

[30] Foreign Application Priority Data

Dec. 27, 1988 [DE] Fed. Rep. of Germany ....... 3843991

[51] Int. Cl.⁵ .............................................. G11B 17/04
[52] U.S. Cl. ................................. 369/75.2; 369/77.1; 360/99.07
[58] Field of Search ...................... 369/75.2, 186, 267, 369/239, 291, 77.1; 360/99.07, 99.03

[56] References Cited

U.S. PATENT DOCUMENTS

4,695,995 9/1987 Koizumi ............................ 369/75.2
4,839,880 6/1989 D'Alayer d'Arc ................ 369/75.2

Primary Examiner—Stuart S. Levy
Assistant Examiner—Joseph A. Rhoa
Attorney, Agent, or Firm—Max Fogiel

[57] ABSTRACT

An arrangement for loading record discs of different diameters for selectively recording and playback purposes. A fixed base member is provided with a depression that has a rim corresponding to a record disc of larger diameter. This rim protects the record disc against displacement. The depression has a central region with a recess which holds a raisable and lowerable rest. Three supports are mounted on the rest and are positioned on a circle which has a diameter that corresponds to the diameter of the smaller disc. The three supports secure the smaller record disc against displacement while, at the time, they serve for supporting the larger record disk. The smaller disc and the larger disc are both brought into an operating position on the base member by the raisable and lowerable rest. This base member is, at the same time, free of guide tracks. The raisable and lowerable rest is disc-shaped, and is held by a pivotable arm.

7 Claims, 8 Drawing Sheets

LOADING DEVICE FOR A RECORD AND/OR REPRODUCTION SET

BACKGROUND OF THE INVENTION

The invention relates to a loading device for a record and/or reproduction set for the loading with records having differing diameter.

CD-players or video record players are e.g. equipped with loading devices for the record-shaped information carrier, the CD-record or the video record.

A CD-record will be centered in a CD-player for reproduction on a record-turntable and started to rotate. The centering of the CD-record is eased by a loading device, into which the CD-record is being laid. This loading device has a circular recess, whose outer diameter is adapted to the outer diameter of regular CD-records in such a way, that the CD-record on one hand can be pre-centered besides a certain radial play and on the other hand is freely rotatable for the reproduction.

CD-records of smaller size, so called mini-CDs, can be not pre-centered without additional measures in the loading device of a CD-player, in such way that they are reproducible. In order to be able to reproduce mini-CDs even though in a common CD-player having a loading device for normal CD-records, the mini-CD is tightly clamped within a ring-shaped disc functioning as an adapter, whose outer diameter corresponds with the outer diameter of a normal CD-record. This ring-shaped disc is being laid into the loading device of the CD-player together with the inserted mini-CD and can now be reproduced like a normal CD-record.

This solution should but not satisfy a CD-fan, because he needs for the reproduction of mini-CDs said ring-shaped disc or similar accessories for the adaptation to the smaller diameter.

A further draw-back is that a mini-CD must be clamped by hand before reproduction within the ring-shaped disc and must be removed out of the same before clamping of next mini-CD is possible.

SUMMARY OF THE INVENTION

Therefore it is object of the invention to construct the loading device of a record and/or reproduction set such, that an information carrier of smaller diameter can be placed into the loading device of the recording and/or reproduction set without accessories and additional handling.

The invention solves this object in that a recess for a descendable rest is provided in the middle of the depression, that on the rest are placed at least three supports on the circumference of a thought circle, whose diameter corresponds with the diameter of the smaller record, whereby the supports secure the smaller record against displacement and on which the larger record rests, and that a record is brought to its reproduction position by descending the rest.

BRIEF DESCRIPTION OF THE DRAWINGS

There are shown in

DESCRIPTION OF THE PREFERRED EMBODIMENTS

In the following the invention will be described and explained using these figures.

Figure 1:
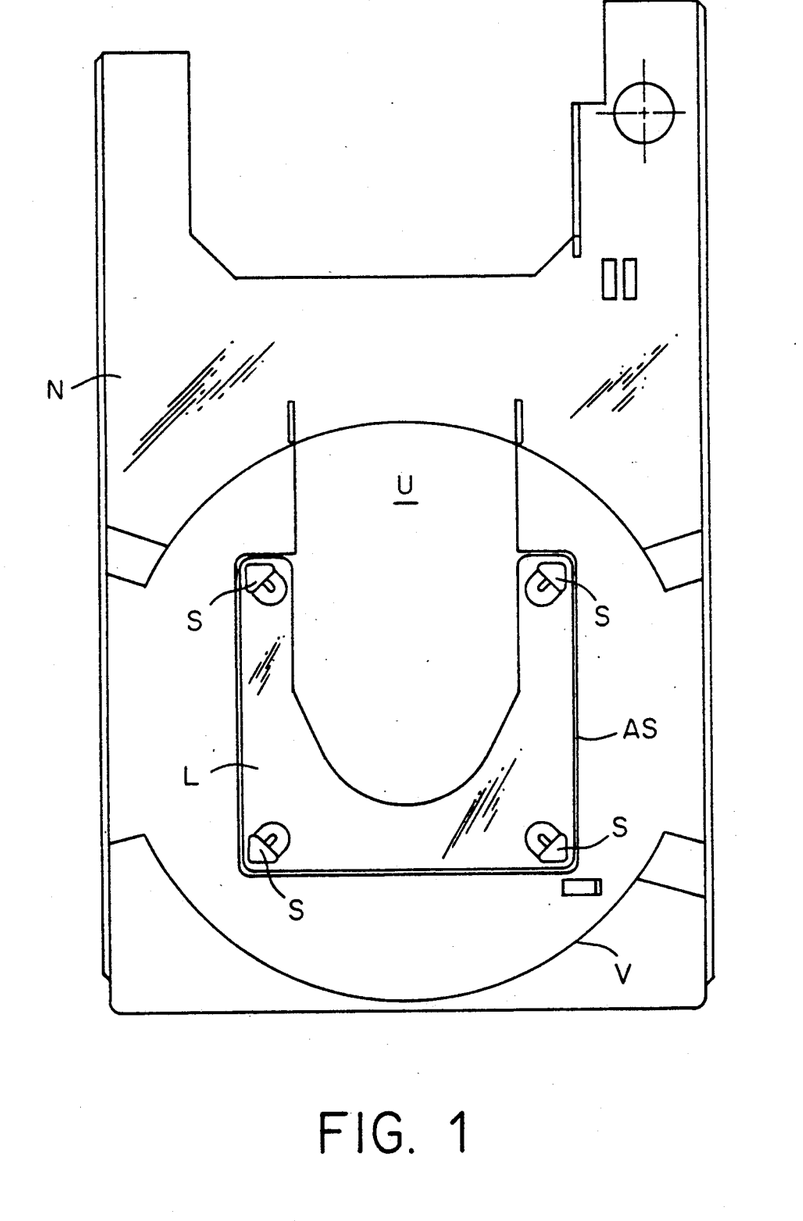
FIG. 1 is an example of the invention seen from above.

An example of a CD-player according to the invention is shown in FIG. 1 from above. The loading device N has a circular depression V, in whose center a square-shaped recess AS is provided for the square-shaped rest L. The square-shaped recess AS is open on the rear side, so that a U-shaped recess is formed. A U-shaped recess is also provided on the same side in the loading device N. These two U-shaped recesses U are provided for the record drive and the tracking device of the CD-player.

On the rest L are arranged four supports S on the circumference of a thought circle, whose diameter corresponds with the outer diameter of a mini-CD. This arrangement is such that a support S is in each corner of the rest L. A mini-CD is being laid between the four supports S, while a normal CD rests on the four supports S. The position of the records can be in the FIGS. 3 to 5.

Figure 2:
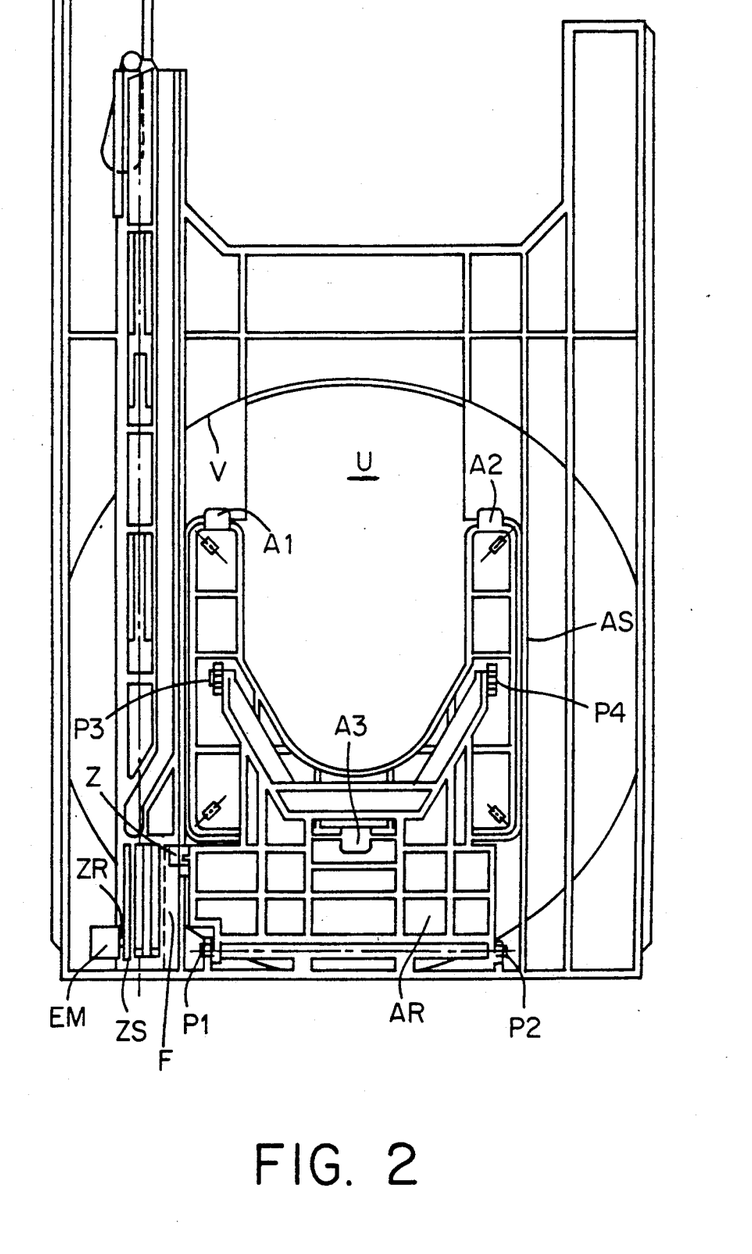
FIG. 2 is the example seen from below.

The FIG. 2 shows the example from below. The rest L is connected mechanically with the loading device N by means of an arm AR. The arm AR is rotatably supported on the fastening points P1, P2, P3 and P4, so that the same can be pushed up and down.

Next to the rest L is a toothed rack ZS having a guiding groove F, in which a pin Z of the arm AR is guided. The arm AR is being pushed up or down by moving the toothed rack ZS forward or backward, which can be e.g. driven by an electromotor EM via a gear wheel ZR. Upward the lifting motion is limited by stops A1 and A2 at the legs formed by the U-shape and by a stop A3 at the front side.

The movement of the rest L up and down is shown and explained by the side-views in the FIGS. 3 to 6.

Figure 3:
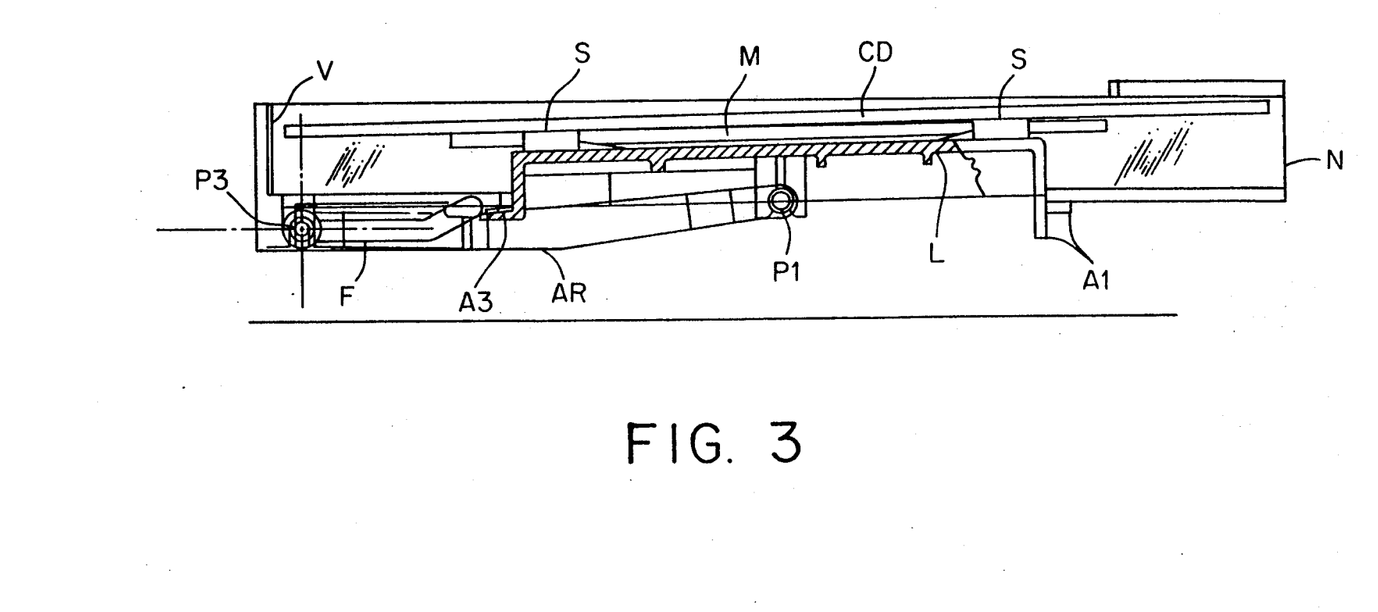
FIG. 3 is a side view of the example.

In FIG. 3 the loading position of rest L is visible. For representation are shown in the drawing as well a CD-record CD of normal size resting on the supports S as well as also a mini-CD M laying between the supports S. In the operational mode are laying either only a CD-record of normal size or a mini-CD in the loading device N. The stops A1, A2 and A3 of the rest L are positioned resting at the loading device N.

Figure 4:
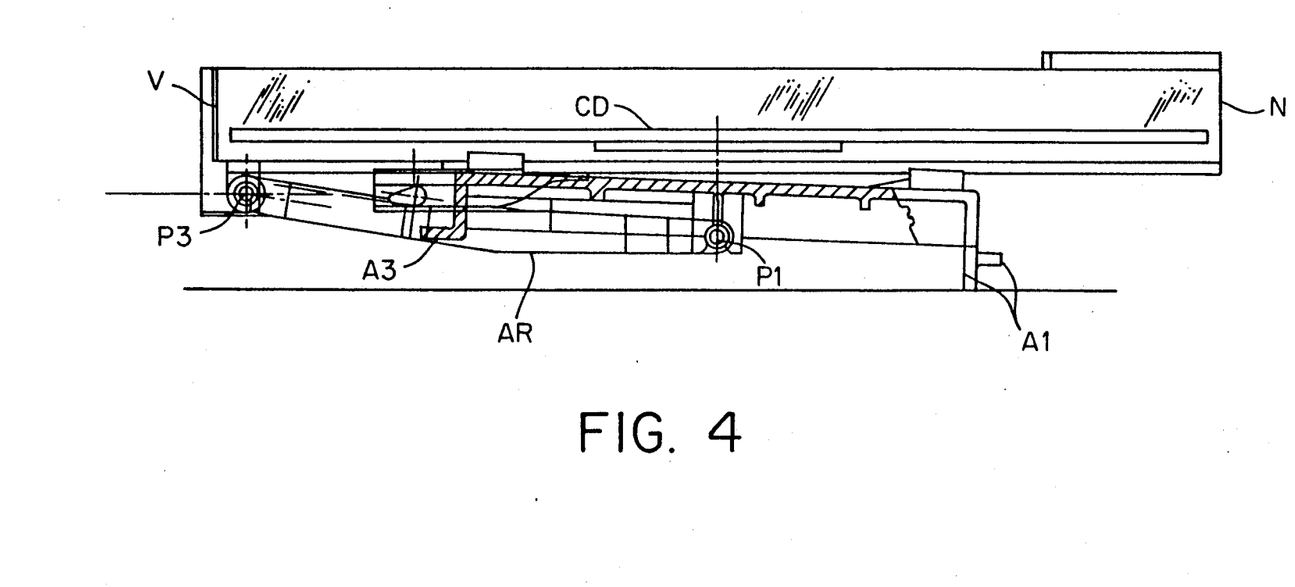
FIG. 4 is a side view of the example.

In FIG. 4 the arm AR is moved downward. Because of the friction in the fastening points P1 and P2 the rest L does not move relative to the arm AR. Therefore the stops A1 and A2 are touching at first a contacting surface of the housing of the CD-player. The arm AR can be constructed such that stop A3 is touching the arm AR at the same time like stops A1 and A2. The rest L is indeed not yet positioned resting parallel to the loading device N, but a inserted CD-record CD or a mini-CD M can be gripped and reproduced already by the record drive.

Figure 5:
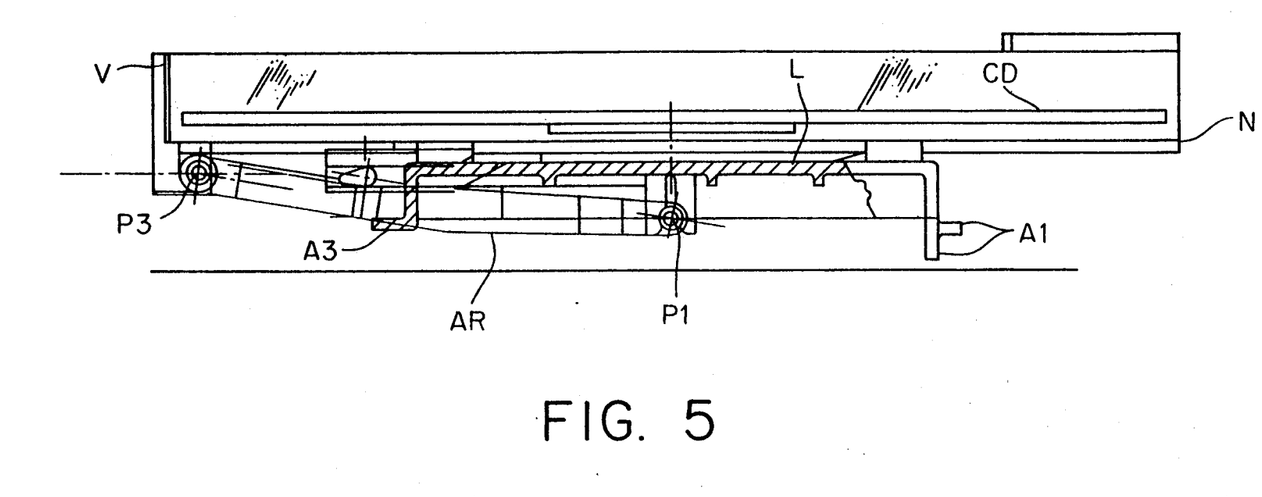
FIG. 5 is a side view of the example.
Figure 6:
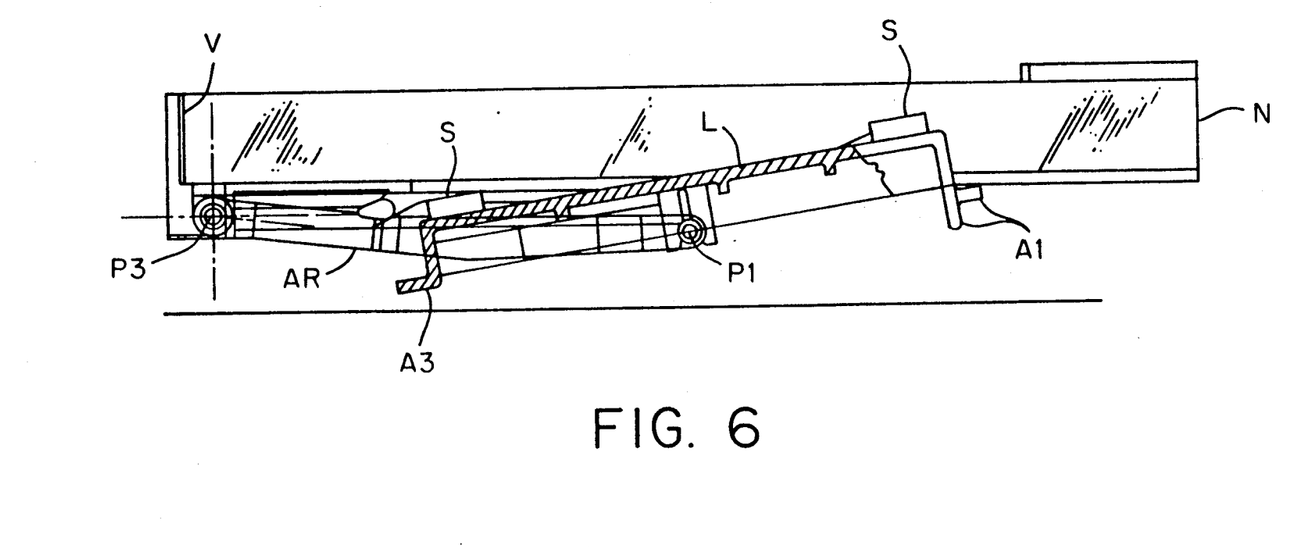
FIG. 6 is a side view of the example.

The arm AR can for instance be also constructed such that the same does not touch the stop A3. When the arm AR is pushed further down, the rest L turns in direction of the arrow about the fastening point of the stops A1 and A2 until finally stop A3 rests also at the contacting surface of the housing. The inserted CD-record or mini-CD is now also in the position of operation. This position is shown in FIG. 5.

The end of the movement of the arm AR is also limited by the form of the guiding groove F in the toothed rack ZS. The stops A1, A2 and A3 serve then only for turning the rest L into the reproduction position. For unloading a CD-record from the loading device N the rest L is being lifted off the arm AR. Due to the friction in the fastening points P1 and P2 again the stops A1 and A2, as shown in FIG. 5, are first touching at the loading device N. Only at further lifting of the arm AR the rest L is turned that much in direction of the arrow about the connecting axis of the stops A1 and A2 until the stop A3 also touches at the loading device N.

An essential advantage of the mechanism for descending the rest L can be visualized in that the anyhow limited space within a CD-player is optimally used. It is not necessary due to the arm AR, which connects the rest L with the loading device N mechanically, to reduce the dimensions of other components.

Figure 7:
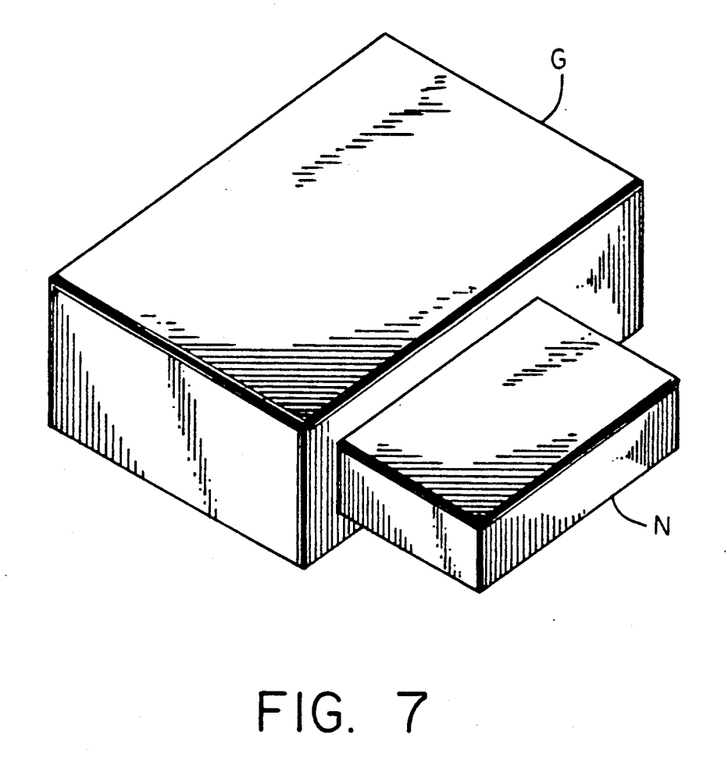
FIG. 7 is a perspective view of the loading device in form of a drawer movable into and out of the housing.
Figure 8:
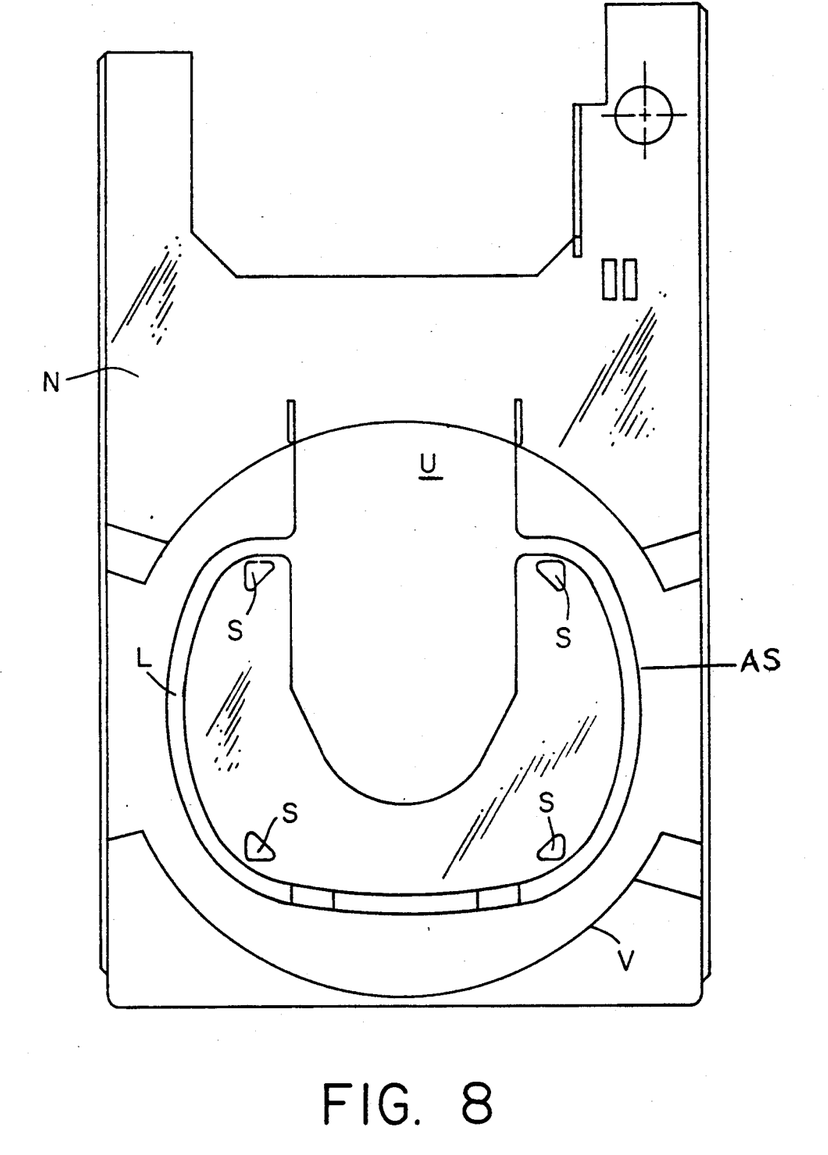
FIG. 8 is another top view similar to FIG. 1 and shows the recess and rest with circular shape.

The loading device N can be for instance constructed as a drawer, which can be moved in and out. For removing of the loaded record and for loading with a new record the drawer is being moved out of the housing G of the CD-player and afterwards moved into the housing again for reproduction of the loaded record.

We claim:

1. An arrangement for loading record discs of different diameters for selectively recording and playback, comprising a base member with a depression having a rim corresponding to a record disc or larger diameter, said rim protecting said record disc against displacement; said depression having a central region with a recess; a raisable and lowerable rest held in said recess; at least three supports on said rest and positioned on a circle having a diameter corresponding to the diameter of a smaller record disc; said supports supporting and securing said smaller record disc against displacement; said larger record disc resting on said supports; said smaller record disc and said larger record disc are both brought into an operating position on said base member by said raisable and lowerable rest; means for raising and lowering said rest, said raisable and lowerable rest having a disc shape; a pivotable arm for holding said rest; and pivot linkage means for securing said rest on said pivotable arm, said rest being pivotable on said arm from a horizontal position; said rest being turned horizontally in upper and lower positions about said pivot linkage means when said rest arrives at said upper and lower positions inclined to the horizontal; said arm linking said raisable and lowerable rest with said base member, said arm being mounted pivotally on said base member and said rest, said arm being pushed downward for lowering said rest, said arm being pushed upward for raising said rest; and stop means for limiting raising and lowering motions of said rest.

2. An arrangement for loading record discs of different diameters for selectively recording and playback, comprising: a base member with a depression having a rim corresponding to a record disc or larger diameter, said rim protecting said record disc against displacement; said depression having a central region with a recess; a raisable and lowerable rest held in said recess; at least three supports on said rest and positioned on a circle having a diameter corresponding to the diameter of a smaller record disc; said supports supporting and securing said smaller record disc against displacement; said larger record disc resting on said supports; said smaller record disc and said larger record disc are both brought into an operating position on said base member by said raisable and lowerable rest; means for raising and lowering said rest, said raisable and lowerable rest having a disc shape; a pivotable arm for holding said rest; said arm linking said rest with said base member, said arm being mounted pivotally on said base member and on said rest, said arm being pushed downward for lowering said rest, said arm being pushed upward for raising said rest; stop means for limiting raising and lowering motions of said rest; a pin on said arm; a toothed rack having a guiding groove for guiding said pin on said arm; gear means in mesh with said toothed rack; motor means for driving said gear means; said rest having an opening for receiving a record disc drive and a tracking device; a housing, said base member comprising a drawer that is movable into and out of said housing; pivot linkage means for securing said rest on said pivotable arm, said rest being pivotable on said arm from a horizontal position; said rest being turned horizontally in upper and lower positions about said pivot linkage means when said rest arrives at said upper and lower positions inclined to the horizontal.

3. An arrangement as defined in claim 1, including a pin on said arm; a toothed rack having a guiding groove for guiding said pin on said arm.

4. An arrangement as defined in claim 3, including gear means meshing with said toothed rack; and motor means for driving said gear means and moving said toothed rack.

5. An arrangement as defined in claim 1, wherein said raisable and lowerable rest has an opening for receiving a record disc drive and a tracking device.

6. An arrangement as defined in claim 1, wherein said rest and said recess are circular-shaped.

7. An arrangement as defined in claim 1, including a housing, said base member comprising a drawer that is movable into or out of said housing.

* * * * *